(12) United States Patent
Miyazawa

(10) Patent No.: US 6,552,507 B2
(45) Date of Patent: Apr. 22, 2003

(54) MOTOR VELOCITY AND ACCELERATION DETERMINING METHOD, ACCELERATION/ DECELERATION GENERATING METHOD, ACCELERATION/DECELERATION CONTROLLING METHOD, ACCELERATION/DECELERATION CONTROLLING APPARATUS AND MOTOR CONTROLLING APPARATUS

(75) Inventor: Hiroshi Miyazawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 09/834,383

(22) Filed: Apr. 13, 2001

(65) Prior Publication Data

US 2001/0056324 A1 Dec. 27, 2001

(30) Foreign Application Priority Data

Apr. 14, 2000 (JP) ........................................ 2000-113073

(51) Int. Cl.$^7$ .............................................. G05B 13/02
(52) U.S. Cl. .................. 318/568.11; 318/276; 318/611
(58) Field of Search ................................ 318/162, 163, 318/268, 271, 276, 277, 278, 279, 567, 568.1, 568.11, 568.18, 611; 388/904

(56) References Cited

U.S. PATENT DOCUMENTS

| 3,828,236 A | * | 8/1974 | Close ......................... 318/561 |
| 3,893,616 A | * | 7/1975 | Trousdale ................ 318/571 X |
| 5,331,264 A | * | 7/1994 | Cheng et al. .......... 318/568.11 |
| 6,002,231 A | * | 12/1999 | Dirkx ......................... 318/609 |
| 6,114,825 A | * | 9/2000 | Katz ............................ 318/615 |

FOREIGN PATENT DOCUMENTS

JP 2918269 4/1999

* cited by examiner

Primary Examiner—Bentsu Ro

(57) ABSTRACT

Acceleration/deceleration control is performed on the basis of a designated jerk control such that a maximum absolute value Jmax of jerk value, which is differential value of acceleration, is made not larger than a predetermined value when a commanded quantity of servomotor movement is smaller than a minimum quantity Smin of motor movement which is required to allow the movement of the servomotor to reach a predetermined maximum velocity Vmax and a predetermined maximum acceleration Amax.

110 Claims, 6 Drawing Sheets

MOTOR VELOCITY AND ACCELERATION DETERMINING METHOD, ACCELERATION/ DECELERATION GENERATING METHOD, ACCELERATION/DECELERATION CONTROLLING METHOD, ACCELERATION/DECELERATION CONTROLLING APPARATUS AND MOTOR CONTROLLING APPARATUS

BACKGROUND OF THE INVENTION

1. Technical Field

The present invention relates to control of acceleration/ deceleration of a motor and particularly relates to generation of an acceleration/deceleration curve to make it possible to suppress vibration given to a subject of control such as a robot manipulator when a command to move by a short distance is given to the subject of control.

2. Description of the Related Art

Heretofore, a manipulator works by repeating a movement operation wherein an end effector is moved from a taught point to the next taught point as designated by a user. In the movement operation from a taught point to another taught point, acceleration/deceleration control is applied over a servomotor actuating a joint of the manipulator. Hence, the end effector is accelerated on the basis of a predetermined acceleration/deceleration curve until the effector reaches a predetermined maximum velocity. After a predetermined constant velocity period, the end effector is decelerated on the basis of the predetermined acceleration/ deceleration curve in the same manner as in the case of acceleration. Hence, the operation of stopping the end effector at the next taught point is achieved. In such servomotor acceleration/deceleration control, a trapezoidal acceleration/deceleration curve may be used. In such an acceleration/deceleration curve, however, acceleration becomes discontinuous at a velocity switching point when acceleration starts, ends, etc. Both impact and vibration of the manipulator become large at such a velocity switching point. To avoid such impact and vibration, therefore, there has been proposed acceleration/deceleration control in which such an acceleration/deceleration curve is changed smoothly over the whole region from the start point through the maximum velocity to the end point to thereby ensure continuity of acceleration.

Such acceleration/deceleration control, however, has a problem that vibration of the manipulator is intensified when a commanded quantity of motor movement is smaller than a minimum quantity of movement which is required to allow the movement of the motor to reach predetermined operating velocity and operating acceleration (hereinafter defined as "a small movement") . To solve the problem of vibration in such small movement, Japanese Patent Application No. 2-22559 has proposed a method in which: simulation is made in advance to generate a correction data table; optimum maximum velocity, acceleration time and deceleration time are determined on the basis of the correction table; and a velocity curve is corrected on the basis of these values to thereby suppress vibration.

Data in the correction table are, however, obtained as results of simulation and are not determined on the basis of predetermined algorithm. Hence, trial and error must be repeated for generating such a correction table.

SUMMARY OF THE INVENTION

The present invention is designed upon such circumstances as described above, and a first object thereof is to provide a method for determining a maximum velocity and a maximum acceleration so as to generate an acceleration/ deceleration curve by which vibration given to a mechanical system can be suppressed when a quantity of movement corresponding to the small movement, as described above, is commanded in acceleration/deceleration control with acceleration kept continuous. A second object is to provide an acceleration/deceleration generating method for generating an acceleration/deceleration curve on the basis of the maximum velocity and maximum acceleration determined by the aforementioned maximum velocity and maximum acceleration determining method. A third object is to provide an acceleration/deceleration control method using the aforementioned maximum velocity and maximum acceleration determining method. A fourth object is to provide an acceleration/deceleration control apparatus using the aforementioned acceleration/deceleration control method. A fifth object is to provide a motor control apparatus using the aforementioned acceleration/deceleration control method. The above objects are achieved as described in the following enumerated paragraphs.

(1) According to an aspect of the present invention, a motor velocity/acceleration determining method is configured as follows. In acceleration/deceleration control of changing acceleration continuously to thereby make acceleration or deceleration, there is provided a method of determining velocity and acceleration of a motor for generating an acceleration/deceleration curve of the motor when a commanded quantity of motor movement is smaller than a minimum quantity of motor movement required to reach a predetermined maximum velocity and a predetermined maximum acceleration. The method includes a step of determining a maximum operating velocity and a maximum operating acceleration for performing a designated jerk control in accordance with the commanded quantity of motor movement so as to make the maximum absolute value of a jerk parameter value (the jerk parameter, or jerk value, is here defined as the differential value of acceleration) not larger than a predetermined value or equal to the predetermined value.

(2) According to another aspect of the present invention, a motor velocity/acceleration determining method is configured as follows. In acceleration/deceleration control for changing acceleration continuously, there is provided a method of determining velocity and acceleration of a motor for generating an acceleration/deceleration curve of the motor when a commanded quantity of motor movement is smaller than a minimum quantity required to reach a predetermined maximum velocity and a predetermined maximum acceleration. The method includes a step of determining a maximum operating velocity and a maximum operating acceleration by selecting and performing one of two processes in accordance with the commanded quantity of motor movement. The two processes consist of a first process of determining a maximum operating velocity for performing a designated acceleration control in accordance with the commanded quantity of motor movement while adopting the predetermined maximum acceleration as a maximum operating acceleration for the control, and consist of a second process of determining a maximum operating velocity and a maximum operating acceleration for performing a designated jerk control in accordance with the commanded quantity of motor movement so as to make the maximum absolute value of the jerk value, which is the differential value of acceleration, not larger than a predetermined value or equal to the predetermined value.

(3) According to a further aspect of the present invention, a motor velocity/acceleration determining method is such that, in the above paragraph (2), the predetermined value in the designated jerk control is the maximum absolute value of jerk value in the designated acceleration control at a switching point where the first and second processes are switched.

(4) According to a still further aspect of the present invention, a motor velocity/acceleration determining method is such that, in the above paragraph (3), the maximum absolute value of jerk value at the switching point is specified on the basis of the maximum operating velocity which is required to obtain the commanded quantity of motor movement with the predetermined maximum acceleration.

(5) According to another aspect of the present invention, a motor velocity/acceleration determining method is such that, in any one of the above paragraphs (3) and (4), setting of the switching point can be changed at user's option.

(6) According to a further aspect of the present invention, a motor velocity/acceleration determining method is such that, in any one of the above paragraphs (3) to (5), the switching point is designated by a nondimensional parameter.

(7) According to a still further aspect of the present invention, a motor velocity/acceleration determining method is such that, in the above paragraph (6), the parameter is set to be a ratio with respect to the minimum quantity of motor movement.

(8) According to another aspect of the present invention, a motor velocity/acceleration determining method is such that, in any one of the above paragraph (1) to (7), the designated jerk control is provided for performing positioning of a subject of control while suppressing vibration of the subject.

(9) According to an aspect of the present invention, an acceleration/deceleration curve generating method is such that the acceleration/deceleration curve is generated on the basis of the maximum velocity and the maximum acceleration obtained by the motor velocity and acceleration determining method defined in any one of the above paragraphs (1) to (8).

(10) According to another aspect of the present invention, an acceleration/deceleration controlling method is configured as follows. There is provided a method for performing acceleration/deceleration control of a motor to make the motor accelerate/decelerate by changing acceleration of the motor continuously. The method includes a step of performing acceleration/deceleration control on the basis of a designated jerk control so as to make the maximum absolute value of the jerk value, which is the differential value of acceleration, not larger than or constantly equal to a predetermined value when a commanded quantity of motor movement is smaller than a minimum quantity of motor movement required to allow the movement of the motor to reach a predetermined maximum velocity and a predetermined maximum acceleration.

(11) According to a further aspect of the present invention, an acceleration/deceleration controlling method is configured as follows. There is provided a method for performing acceleration/deceleration control of a motor to make the motor accelerate/decelerate by changing acceleration of the motor continuously. The method includes a step of selecting and performing one of two control processes in accordance with a commanded quantity of motor movement when the commanded quantity of motor movement is smaller than a minimum quantity of motor movement required to allow the motor to reach a predetermined maximum velocity and a predetermined maximum acceleration. The two control processes consist of a designated acceleration control process and a designated jerk control process. The designated acceleration control process controlling the motor so as to make the maximum operating acceleration in an accelerating/decelerating operation equal to the predetermined maximum acceleration. The designated jerk control process controlling the motor so as to make the maximum absolute value of the jerk value, which is the differential value of acceleration, not larger than or constantly equal to a predetermined value.

(12) According to a still further aspect of the present invention, an acceleration/deceleration controlling method is configured such that, in the above paragraph (11), the predetermined value in the designated jerk control is the maximum absolute value of jerk value at a switching point where the acceleration control process and the jerk control process are switched.

(13) According to another aspect of the present invention, an acceleration/deceleration controlling method is such that, in the above paragraph (12), the maximum absolute value of jerk value at the switching point is specified on the basis of a maximum operating velocity which is required to obtain the commanded quantity of motor movement with the predetermined maximum acceleration.

(14) According to a further aspect of the present invention, an acceleration/deceleration controlling method is such that in any one of the above paragraphs (12) and (13), setting of the switching point can be changed at user's option.

(15) According to a still further aspect of the present invention, an acceleration/deceleration controlling method is such that, in any one of the above paragraphs (12) to (14), the switching point is designated by a nondimensional parameter.

(16) According to another aspect of the present invention, an acceleration/deceleration controlling method is such that, in the above paragraph (15), the parameter is set to be a ratio with respect to the minimum quantity of motor movement.

(17) According to a further aspect of the present invention, an acceleration/deceleration controlling method is such that, in any one of the above paragraphs (10) to (16), the designated jerk control is provided for performing positioning of a subject of control while suppressing vibration of the subject.

(18) According to an aspect of the present invention, an acceleration/deceleration control apparatus is as follows. There is provided an acceleration/deceleration control apparatus for performing acceleration/deceleration control of a motor to make the motor accelerate/decelerate by changing acceleration of the motor continuously. The apparatus includes a velocity and acceleration determining means for determining a new maximum velocity and a new maximum acceleration for performing a designated jerk control so as to make the maximum absolute value of the jerk value, which is the differential value of acceleration, not larger than or constantly equal to a predetermined value when a commanded quantity of motor movement is smaller than a minimum quantity of motor movement required to reach a predetermined maximum velocity and a predetermined maximum acceleration. The apparatus also includes a reference value generating means for generating and outputting a position reference value on the basis of the new maximum velocity and new maximum acceleration obtained by the velocity and acceleration determining means.

(19) According to another aspect of the present invention, an acceleration/deceleration control apparatus is as follows. There is provided an acceleration/deceleration control apparatus for performing acceleration/deceleration control of a motor to make the motor accelerate/decelerate by changing acceleration of the motor continuously. The apparatus includes a velocity and acceleration determining means for determining a maximum operating velocity and a maximum operating acceleration by selecting and performing one of two processes in accordance with a commanded quantity of motor movement when the commanded quantity of motor movement is smaller than a minimum quantity of motor movement required to reach a predetermined maximum velocity and a predetermined maximum acceleration. The two processes consist of a first process for newly determining a first maximum operating velocity for performing a designated acceleration control on the basis of the commanded quantity of motor movement so as to make a first maximum operating acceleration in an accelerating/decelerating operation equal to the predetermined maximum acceleration, and consist of a second process for newly determining a second maximum operating velocity and a second maximum operating acceleration for performing a designated jerk control on the basis of the commanded quantity of motor movement so as to make the maximum absolute value of jerk value, which is the differential value of acceleration, not larger than or constantly equal to a predetermined value. The apparatus also includes a reference value generating means for generating and outputting a position reference value on the basis of the maximum operating velocity and maximum operating acceleration obtained by the velocity and acceleration determining means.

(20) According to a further aspect of the present invention, an acceleration/deceleration control apparatus is such that, in the above paragraph (19), the predetermined value in the designated jerk control is the maximum absolute value of jerk value in the designated acceleration control at a switching point where the first and second processes are switched.

(21) According to a still further aspect of the present invention, an acceleration/deceleration controlling apparatus is such that, in the above paragraph (20), the maximum absolute value of jerk value at the switching point is specified on the basis of the first maximum operating velocity, which is required to obtain the commanded quantity of motor movement with the predetermined maximum acceleration and on the basis of the predetermined maximum acceleration.

(22) According to another aspect of the present invention, an acceleration/deceleration controlling apparatus is such that, in any one of the above paragraphs (20) and (21), the acceleration/deceleration controlling apparatus further comprises a setting means for setting and changing the switching point.

(23) According to a further aspect of the present invention, an acceleration/deceleration controlling apparatus is such that, in any one of the above paragraphs (20) to (22), the switching point is designated by a nondimensional parameter.

(24) According to a still further aspect of the present invention, an acceleration/deceleration controlling apparatus is such that, in the above paragraph (23), the parameter is a ratio with respect to the minimum quantity of motor movement.

(25) According to another aspect of the present invention, an acceleration/deceleration controlling apparatus is such that, in any one of the above paragraphs (18) and (24), the designated jerk control is provided for performing positioning of a subject of control while suppressing the vibration of the subject.

(26) According to an aspect of the present invention, A motor control apparatus is such that the motor control apparatus receives a position reference value supplied from the acceleration/deceleration control apparatus defined in any one of the above paragraphs (18) to (25) so as to control at least one motor in accordance with the position reference value.

According to the paragraphs (1), (9), (10), (18) and (26) the maximum absolute value of jerk value is limited to a small value so that the maximum absolute value is not larger than a predetermined value. Hence, vibration given to a mechanical system driven by the motor can be suppressed.

According to the paragraphs (2), (9), (11), (19) and (26), one of the designated jerk control and the designated acceleration control is switched over to the other in accordance with the commanded quantity of motor movement. Hence, a system in consideration of shortening of moving time and suppression of vibration can be constructed.

According to the paragraphs (3), (4), (9), (12), (13) (20), (21) and (26), the predetermined value in the designated jerk control is the maximum jerk value (the maximum of the absolute value of jerk) in the designated acceleration control at the switching point. Hence, when the commanded quantity of motor movement is changed continuously, the obtained velocity, acceleration and moving time change continuously. A natural operation is therefore obtained as a whole.

According to the paragraphs (5), (9), (14), (22) and (26), the switching point can be changed at user's option. Hence, the optimum switching point can be set in accordance with the accuracy, the allowable range of vibration, etc. required for constructing the system.

According to the paragraphs (6), (7), (9), (15), (16), (23), (24) and (26), the switching point can be designated by a nondimensional parameter. Hence, the switching point can be set without considering the quantity of motor movement.

According to the paragraphs (8), (9), (17), (25) and (26), the designated jerk control can be performed. Hence, a subject of control can be positioned while vibration of the subject is suppressed.

DETAILED DESCRIPTION OF THE PREFERRED EMBODIMENT

Before the description of an embodiment of the present invention, requirements for acceleration/deceleration control will be described. One requirement is to suppress vibration of a mechanical system as described above about the prior art. The other requirement is to shorten moving time (positioning time). A first movement control method/system that addresses the first requirement of suppressing vibration is herein referred to as a designated jerk control, and a second movement control method/system that addresses the second requirement of reducing positioning time is herein referred to as a designated acceleration control.

Considering first the latter method of designated acceleration control for satisfying the latter requirement of a shorten positioning time in a small movement, this method is a control method in which the maximum operating velocity is reduced to thereby make it possible to operate a manipulator by the commanded quantity of movement while a predetermined maximum acceleration is adopted as the maximum operating acceleration. When the method is used in an acceleration/deceleration curve satisfying continuity of acceleration, there is, however, a tendency that the operation of the manipulator becomes vibratory.

Figure 2:
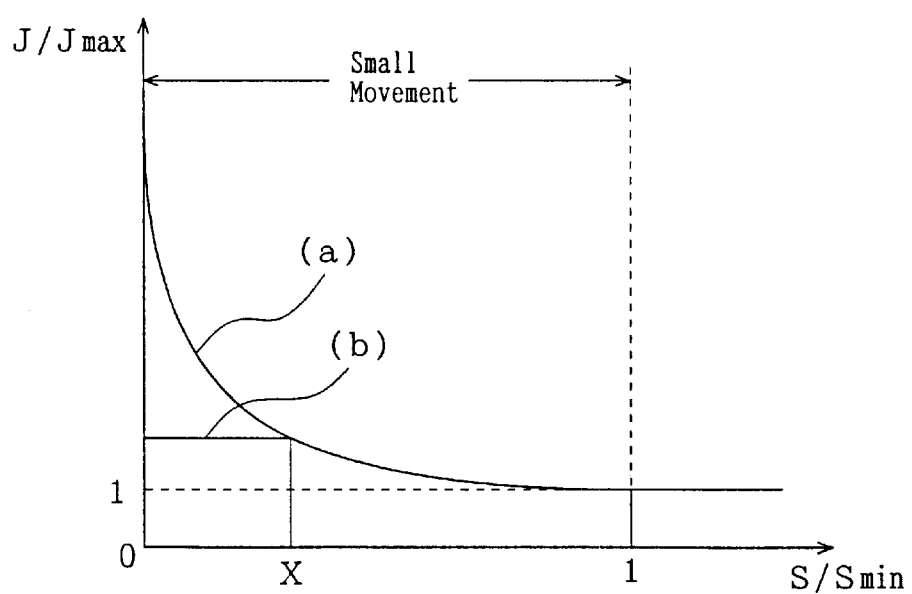
FIG. 2 is a graph showing the relation between the quantity of motor movement and the value of jerk with non-dimensional parameters in a designated acceleration control.

FIG. 2 is an explanatory graph for explaining vibration of the manipulator in this case. FIG. 2 shows the relation (a curve designated by (a)) between the quantity of motor movement S and the maximum jerk value J in the designated acceleration control. In the graph, the horizontal axis and the vertical axis are represented by non-dimensional parameters which are obtained by dividing the quantity of movement S and the maximum of the jerk value J by corresponding reference movement and jerk values, respectively. Incidentally, curve (b) will be described later.

In FIG. 2, S is the commanded quantity of motor movement, and Smin is the minimum quantity of motor movement which is required to allow the movement of the motor to reach a predetermined maximum velocity and the predetermined maximum acceleration. J is the maximum jerk value at the commanded quantity S of movement, and Jmax is the maximum jerk value when the movement is not the small movement (that is, the commanded quantity S of movement is not smaller than Smin).

The jerk value used herein means a value obtained by differentiating acceleration. The jerk value is used as an indicator for knowing the tendency of vibration. It is known as a general tendency that vibration is intensified when the jerk value is large. Referring to FIG. 2 with this general tendency in mind, the jerk value increases as S/Smin approaches zero. That is, it can be guessed that vibration increases as the commanded quantity of movement decreases.

Summarizing the above description, vibration increases at the time of the small movement when the designated acceleration control is performed to attain reduction of moving time.

As shown as a curve (b) in FIG. 2, therefore, the present invention aims at suppressing residual vibration by limiting (i.e. designated jerk control of) the maximum jerk value J to be not larger than a predetermined value in an area up to a point X of the quantity of movement, though the maximum jerk value would typically be getting larger according to the decrease of the commanded quantity of movement S in the designated acceleration control. The method for determining maximum operating velocity and maximum operating acceleration to generate an acceleration/deceleration curve for performing such a designated jerk control will be described below in detail.

Incidentally, in the designated jerk control, though a pronounced effect is expected to suppress vibration, the required moving time is prolonged as compared with the designated acceleration control. Thus, the designated acceleration control has the advantage that the moving time can be shortened while it has the disadvantage that vibration is intensified.

There are two types of work required of a manipulator. That is, one type is work requiring sufficient accuracy (work to avoid residual vibration), and the other type is work giving priority to speed at the sacrifice of accuracy, more or less. Therefore, it is preferable that the movement control method (either designated jerk control or designated acceleration control) can be selected in accordance with the purpose of the work. For this reason, this embodiment of the present invention is configured so that one of the designated acceleration control and the designated jerk control can be switched over to the other and so that a point for switching the movement control method can be set as a user's option.

Figure 1:
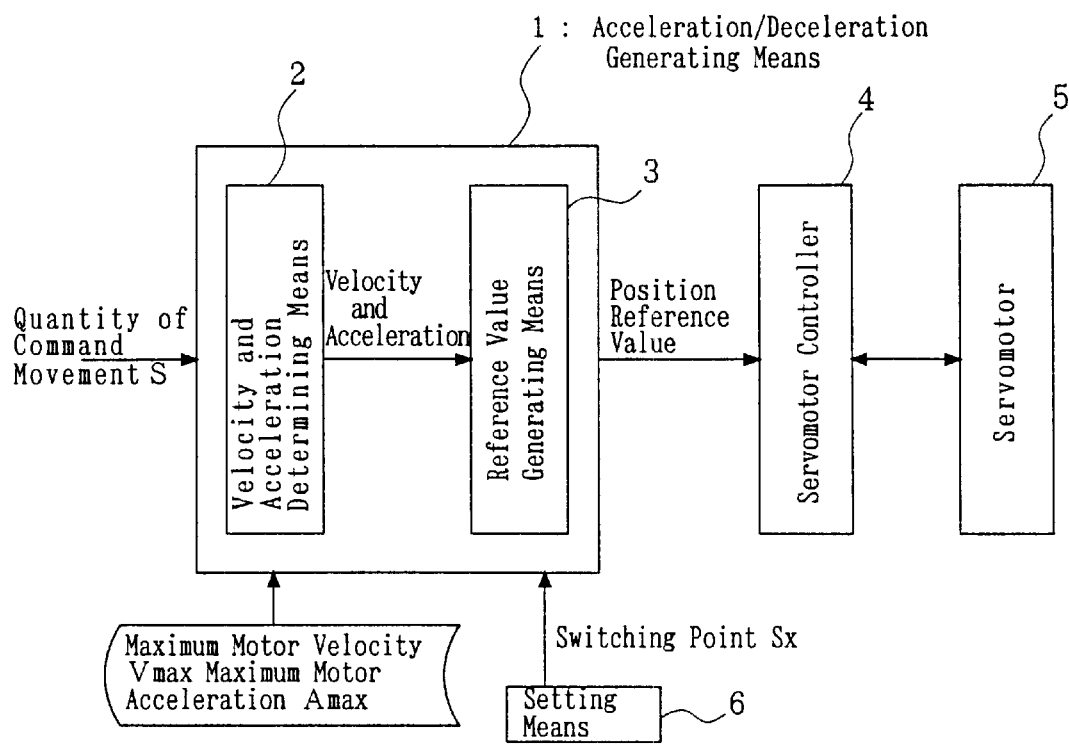
FIG. 1 is a block diagram showing the configuration of an acceleration/deceleration control apparatus according to an embodiment of the present invention.

FIG. 1 is a block diagram showing the configuration of an acceleration/deceleration control apparatus according to an embodiment of the present invention.

In FIG. 1, an acceleration/deceleration control means 1 is constituted by a velocity and acceleration determining means 2, and a reference value generating means 3. The velocity and acceleration determining means 2 newly calculates a maximum velocity and a maximum acceleration corresponding to a commanded quantity of motor movement on the basis of the commanded quantity of movement and a predetermined maximum motor velocity and a predetermined maximum motor acceleration, and outputs results of the calculation. The reference value generating means 3 generates a position reference value (a target position or a difference between the present position and the target position) consecutively on the basis of the velocity and acceleration supplied from the velocity and acceleration determining means 2, and outputs the position reference value.

A servomotor controller 4 receives the position reference value from the acceleration/deceleration control means 1, converts the position reference value into a torque reference value and controls a servomotor 5 to operate on the basis of the torque reference value. The reference value generating means 3 makes an operation repeatedly in a predetermined period Tsample to form an orbit of movement from an orbit start point to an orbit end point and completes the operation at an operation termination time Tend. The servomotor controller 4 carries out feedback control so that the position of the servomotor 5 always follows a position reference supplied from the reference value generating means 3.

A setting means 6 can be operated by a user to set a switching point for switching over between the designated acceleration control and the designated jerk control. Incidentally, the data inputted by the user to set the switching point is a fraction (defined by a percentage parameter C) of the minimum quantity Smin of motor movement and the parameter C is designated by a number of 1 to 100. On the basis of the parameter C inputted through the setting means 6, the quantity Sx of motor movement (hereinafter referred to as "switching point Sx") set on the apparatus side as a switching point is calculated as $Sx = C \times Smin/100$. The switching point Sx is stored in a memory not shown, so that the setting of the switching point Sx is completed. Incidentally, the parameter C may be inputted as a direct value by the user or may be selected from a plurality of values by the user. It is a matter of course that the parameter C may be set as a fixed value on the apparatus side in advance.

Figure 3:
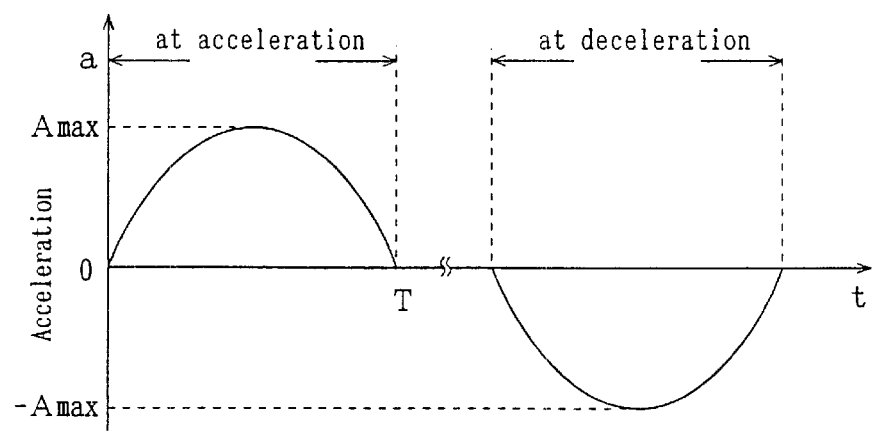
FIG. 3 is a graph showing an example of an acceleration/deceleration curve (sine curve).
Figure 4:
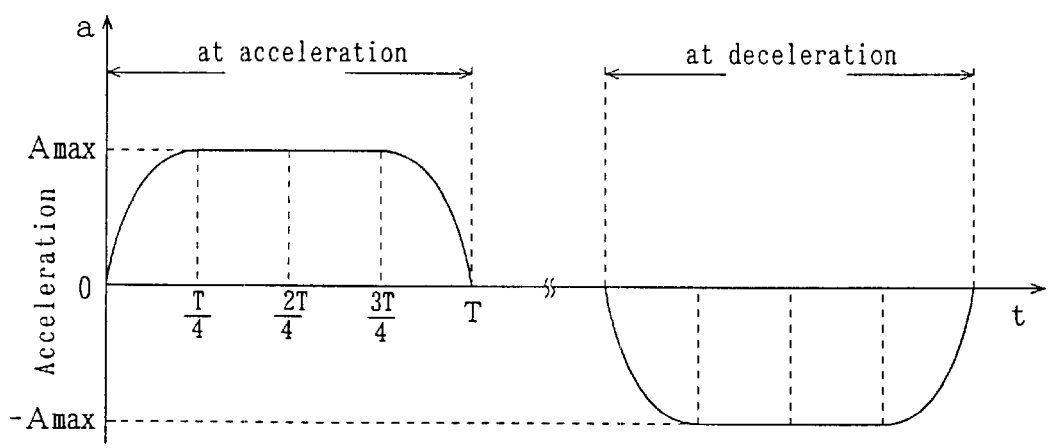
FIG. 4 is a graph showing another example of the acceleration/deceleration curve (modified sine curve).
Figure 5:
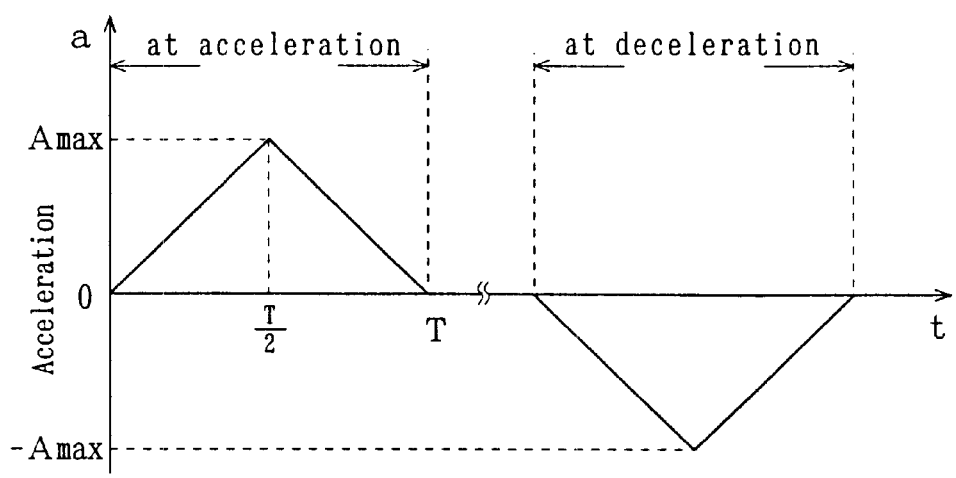
FIG. 5 is a graph showing a further example of the acceleration/deceleration curve (triangular curve).

FIGS. 3 to 5 are graphs showing examples of three types of acceleration curves satisfying the continuity of acceleration. That is, FIGS. 3 to 5 respectively show a curve of a trigonometric function (a sine function) (hereinafter referred to as "sine curve"), a curve of a trigonometric function (sine function) modified with a uniform acceleration section provided between the start of acceleration and the end of acceleration (hereinafter referred to as "modified sine curve"), and a curve of a linear function (hereinafter referred to as "triangular curve" in terms of the shape thereof). Although FIGS. 3 to 5 show the case where one and the same value of maximum acceleration Amax is used both in an acceleration stage and in a deceleration stage, for the sake of simplicity, it is a matter of course that different values may be used. In the following description, the operation in the acceleration stage (that is $0 \leq t \leq T$ (T: acceleration time)) will be described while the description of the operation in the deceleration stage will be omitted.

The operation of this embodiment as applied to the acceleration/deceleration curves f FIGS. 3–5 will be described below with reference to the drawings.

Figure 6:
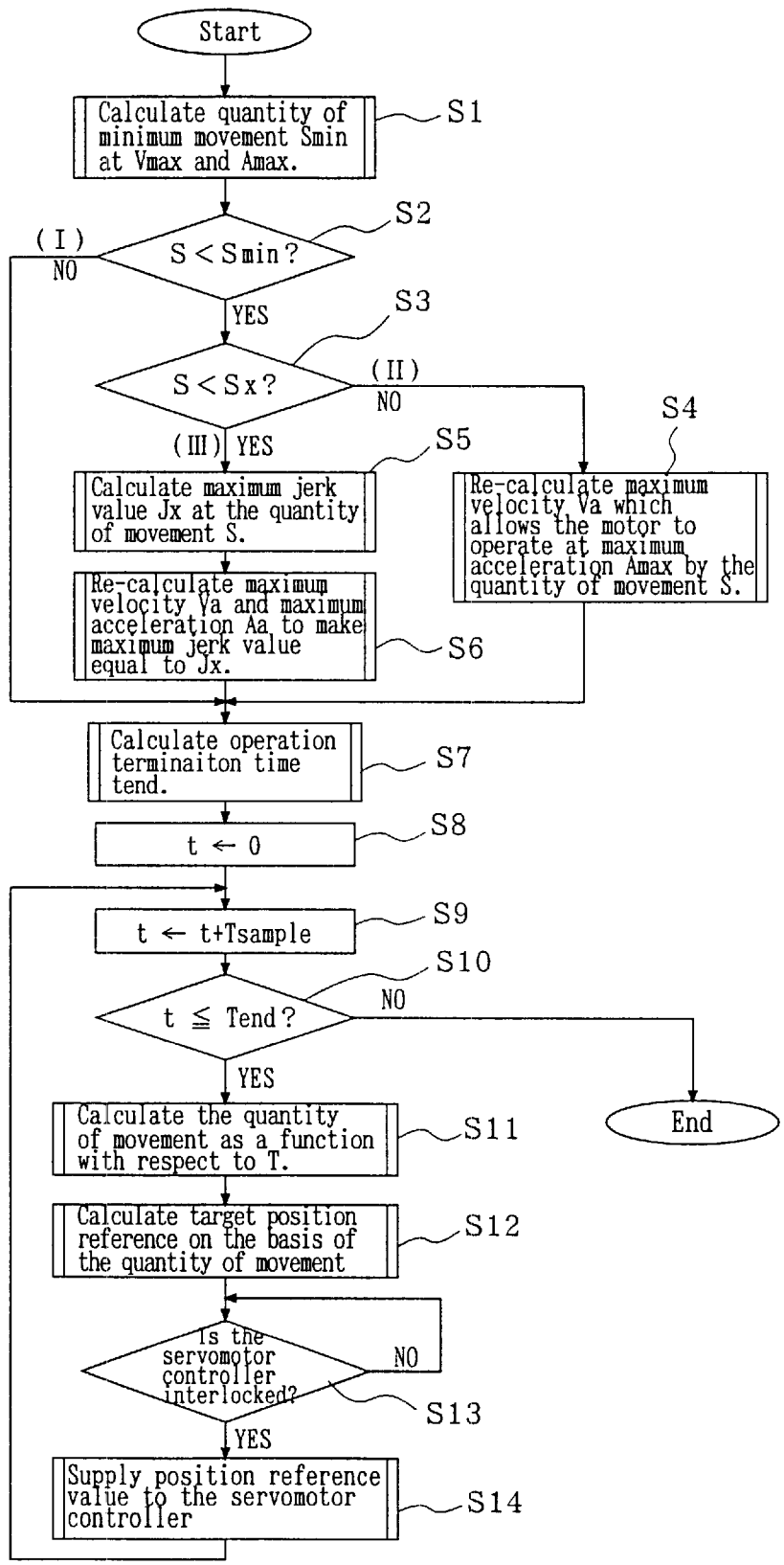
FIG. 6 is a flow chart showing a flow of processing in an embodiment according to the present invention.

FIG. 6 is a flow chart showing a flow of processing in an embodiment of the present invention as applied to the acceleration/deceleration curves f FIGS. 3–5.

First, the minimum quantity Smin of motor movement which is required to allow the movement of the motor to reach a predetermined maximum velocity Vmax and a predetermined maximum acceleration Amax given by the user is calculated (S1 in FIG. 6). This calculation will be described below in connection with each type of acceleration/deceleration curve shown in FIGS. 3–5.

(1) Case of Sine Curve

Respective functions of acceleration $\underline{a}$, velocity $\underline{v}$ and quantity $\underline{s}$ of movement with respect to $\underline{t}$ are shown as follows.

$$a = A_{\max} \cdot \sin\left(\frac{\pi}{T} t\right) \tag{1}$$

$$v = \frac{A_{\max}T}{\pi} - \frac{A_{\max}T}{\pi} \cos\left(\frac{\pi}{T} t\right) \tag{2}$$

$$s = \frac{A_{\max}T}{\pi} t - \frac{A_{\max}T^2}{\pi^2} \sin\left(\frac{\pi}{T} t\right) \tag{3}$$

in which $(0 \leq t \leq T)$

Incidentally, acceleration time T is obtained by T=π Vmax/2Amax because the velocity $\underline{v}$ reaches the predetermined value Vmax at the acceleration time T.

The minimum quantity Smin of motor movement is a value obtained by doubling an integrated value of velocity $\underline{v}$ in a period from time 0 to acceleration time T (because the quantity of movement in the deceleration period is added). That is, Smin is obtained by the following expression.

$$Smin = \pi Vmax^2/2Amax \tag{4}$$

These in the case of the other acceleration/deceleration curves can be obtained in the same manner as described above. That is, in the case of the other acceleration/deceleration curves, they are obtained by combinations of the following expressions (5) to (8) and (9) to (12), respectively.

(2) Case of Modified Sine Curve $$\begin{aligned} a &= A_{\max} \sin\left(\frac{2\pi}{T} t\right) & \left(0 \leq t < \frac{T}{4}\right) \\ a &= A_{\max} & \left(\frac{T}{4} \leq t < \frac{3}{4}T\right) \\ a &= A_{\max} \sin\left(\frac{2\pi}{T} t - \pi\right) & \left(\frac{3}{4}T \leq t \leq T\right) \end{aligned} \tag{5}$$

$$\begin{aligned} v &= \frac{A_{\max}T}{2\pi} - \frac{A_{\max}T}{2\pi} \cos\left(\frac{2\pi}{T} t\right) & \left(0 \leq t < \frac{T}{4}\right) \\ v &= A_{\max} t - \frac{A_{\max}T(\pi - 2)}{4\pi} & \left(\frac{T}{4} \leq t < \frac{3}{4}T\right) \\ v &= -\frac{A_{\max}T}{2\pi} \cos\left(\frac{2\pi}{T} t - \pi\right) + \frac{A_{\max}T(\pi + 1)}{2\pi} & \left(\frac{3}{4}T \leq t \leq T\right) \end{aligned} \tag{6}$$

$$\begin{aligned} s &= \frac{A_{\max}T}{2\pi} t - \frac{A_{\max}T^2}{4\pi^2} \sin\frac{2\pi}{T} t & 0 \leq t < \frac{T}{4} \\ s &= \frac{A_{\max}}{2} t^2 - \frac{A_{\max}T(\pi - 2)}{4\pi} t + \frac{A_{\max}T(\pi^2 - 8)}{32\pi^2} & \left(\frac{T}{4} \leq t < \frac{3}{4}T\right) \\ s &= \frac{A_{\max}T(\pi + 1)}{2\pi} t - \frac{A_{\max}T^2}{4\pi^2} \sin\left(\frac{2\pi}{T} t - \pi\right) - \frac{A_{\max}T}{4} & \left(\frac{3}{4}T \leq t \leq T\right) \end{aligned} \tag{7}$$

$$T = \frac{2\pi V_{\max}}{(\pi + 2)A_{\max}} \tag{8}$$

$$S_{\min} = \frac{2\pi V_{\max}^2}{(\pi + 2)A_{\max}}$$

(3) Case of Triangular Curve $$\begin{aligned} a &= \frac{2A_{\max}}{t} t & \left(0 \leq t < \frac{T}{2}\right) \\ a &= 2A_{\max} - \frac{2A_{\max}}{t} t & \left(\frac{T}{2} \leq t \leq T\right) \end{aligned} \tag{9}$$

$$v = \frac{A_{max}}{T} t^2 \qquad \left(0 \le t < \frac{T}{2}\right)$$
$$v = 2A_{max}t - \frac{A_{max}}{T} t^2 - \frac{A_{max}T}{2} \qquad \left(\frac{T}{2} \le t \le T\right)$$
(10)

$$s = \frac{A_{max}}{3T} t^3 \qquad \left(0 \le t < \frac{T}{2}\right)$$
$$s = -\frac{A_{max}}{3T} t^3 + A_{max}t^2 - \frac{A_{max}T}{2} t + \frac{A_{max}T^2}{12} \qquad \left(\frac{T}{2} \le t \le T\right)$$
(11)

$$T = \frac{2V_{max}}{A_{max}}$$
(12)

$$S_{min} = \frac{2V^2{max}}{A_{max}}$$

Then, the quantity S of motor movement (the commanded quantity of motor movement) instructed by the user is compared with the minimum quantity Smin of motor movement corresponding to the appropriate acceleration/deceleration curve of FIGS. 3–5 (S2 in FIG. 6). When the commanded quantity S of movement is smaller than the minimum quantity Smin of movement, the commanded quantity S of movement is further compared with the switching point Sx (S3 in FIG. 6). If quantity S is not smaller than Sx, then designated acceleration control is used, and if quantity S is smaller than Sx, then designated jerk control is used. Incidentally, the switching point Sx is set in advance on the basis of the parameter C inputted by the user. The process for determining a maximum operating velocity and a maximum operating acceleration proceeds differently in three different cases (I) to (III) in accordance with results of these comparisons, so that the maximum operating velocity and the maximum operating acceleration are determined in one of the three cases. Incidentally, the cases (II) and (III) correspond to the small movement (S >Smin).

The method for determining a maximum operating velocity and a maximum operating acceleration will be described below in each of the three cases.

Case (I)

The case (I) does not correspond to small movement. Hence, the motor can be operated at the predetermined maximum velocity Vmax and the predetermined maximum acceleration Amax. Therefore, these predetermined values are adopted as the maximum operating velocity and the maximum operating acceleration in the acceleration/deceleration operation.

Case (II) (Designated Acceleration Control)

The predetermined maximum acceleration Amax is used as the maximum operating acceleration but the maximum operating velocity is re-calculated (S4). The maximum operating velocity Va re-calculated herein is the maximum value of velocity attained in operation of the commanded quantity S of motor movement under the condition that the motor is operated along an acceleration curve having the maximum acceleration Amax. Therefore, the maximum operating velocity Va is re-calculated by replacing Smin in the appropriate expressions (4), (8) and (12) with the commanded quantity S of movement in accordance with the acceleration/deceleration curves while keeping the maximum acceleration Amax intact. That is, the maximum operating velocity Va is given by the following expressions.

(1) Case of Sine Curve $$Va = (2 \cdot Amax \cdot S / \pi)^{1/2}$$

(2) Case of Modified Sine Curve $$Va = ((\pi + 2) \cdot Amax \cdot S / 2\pi)^{1/2}$$

(3) Case of Triangular Curve $$Va = (Amax \cdot S / 2)^{1/2}$$

Case (III) (Designated Jerk Control)

In this case, both maximum operating velocity Va and maximum operating acceleration Aa are calculated anew. First, the maximum value Jx of jerk value at the switching point Sx is obtained (S5). Then, both maximum operating velocity Va and maximum operating acceleration Aa are re-calculated so as to result in a maximum value of jerk value equal to Jx (S6). Incidentally, the relational expression between Jmax and the predetermined maximum velocity Vmax and maximum acceleration Amax is obtained prior to the calculation of Jx.

Figure 7:
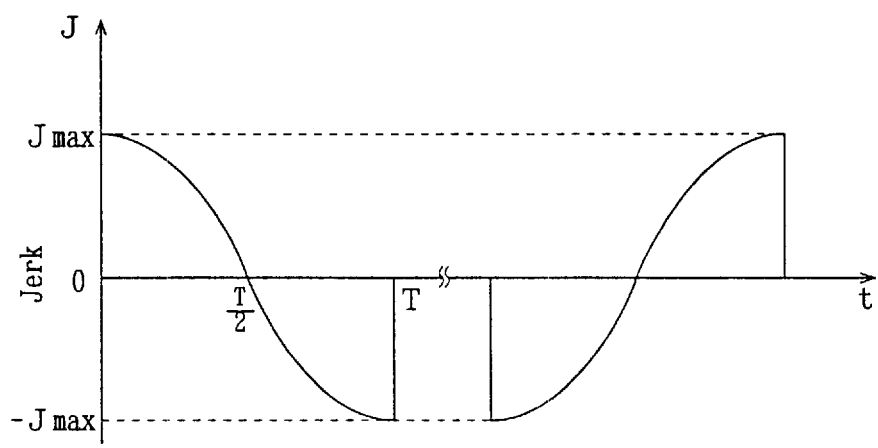
FIG. 7 is a graph showing a curve of jerk in the acceleration/deceleration curve depicted in FIG. 4.
Figure 8:
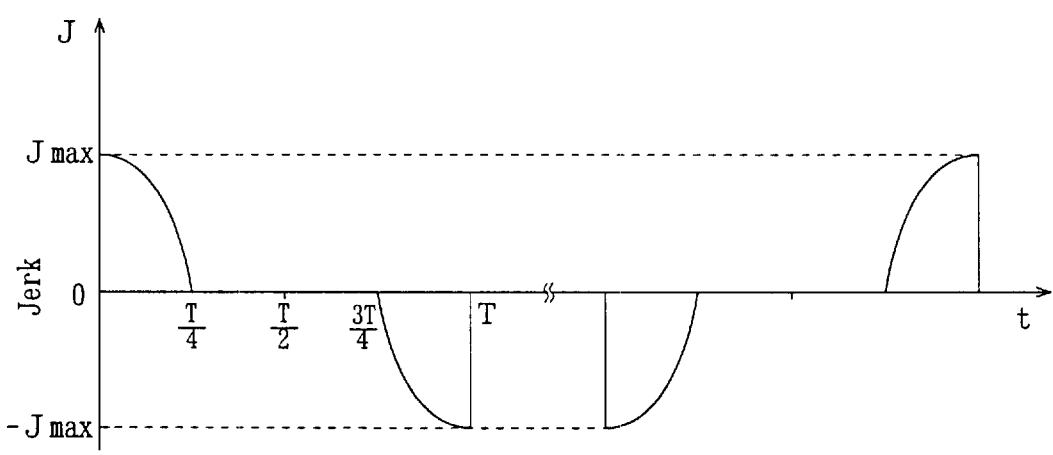
FIG. 8 is a graph showing a curve of jerk in the acceleration/deceleration curve depicted in FIG. 5.
Figure 9:
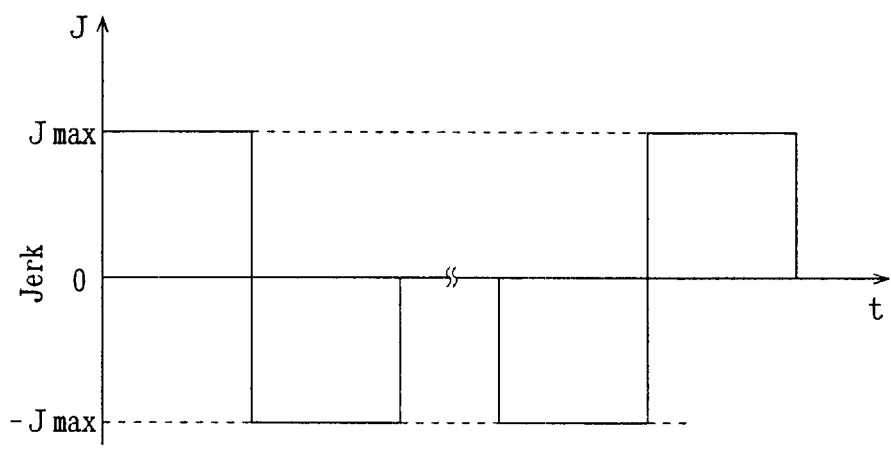
FIG. 9 is a graph showing a curve of jerk in the acceleration/deceleration curve depicted in FIG. 6.

FIGS. 7 to 9 are graphs showing curves of jerk corresponding to the acceleration/deceleration curves depicted in FIGS. 4 to 5, respectively.

(1) Case of Sine Curve

The jerk function is obtained by differentiating the acceleration function of the expression (1). That is, the jerk function is given by the following expression.

$$J = \frac{2A_{max}^2}{V_{max}} \cos\left(\frac{2A_{max}}{V_{max}} t\right) \qquad (0 \le t \le T)$$

Hence, the relational expression given by the following expression is obtained.

$$Jmax = 2Amax^2 / Vmax$$

Also in each of the cases (2) and (3) of the acceleration/deceleration curves, the relational expression is obtained in the same manner as described above. That is, the relational expression is as follows.

(2) Case of Modified Sine Curve $$J = \frac{(\pi+2)A_{max}^2}{V_{max}} \cos\left(\frac{(\pi+2)A_{max}}{V_{max}}\right) t \left(0 \le t \le \frac{T}{4}\right)$$
$$J = 0 \qquad \left(\frac{T}{4} \le t < \frac{3}{4} T\right)$$
$$J = \frac{(\pi+2)A_{max}^2}{V_{max}} \cos\left(\frac{(\pi+2)A_{max}}{V_{max}} t - \pi\right) \left(\frac{3}{4} T \le t \le T\right)$$

-continued $$J_{max} = \frac{(\pi + 2)A_{max}^2}{V_{max}}$$

(3) Case of Triangular Curve $$J = Amax^2 / Vmax \ (0 \le t < T/2)$$

$$J = -Amax^2 / Vmax \ (T/2 \le t \le T)$$

$$Jmax = Amax^2 / Vmax$$

The maximum jerk value Jx is given by the following expressions using the maximum velocity Vx at the switching point Sx and the predetermined maximum acceleration Amax on the basis of the aforementioned relational expressions. Incidentally, the maximum velocity Vx is obtained in accordance with the acceleration/deceleration curves by replacing Smin in the expressions (4), (8) and (12) with Sx while keeping Amax intact.

(1) Case of Sine Curve $$Jx=2Amax^2/Vx$$

(2) Case of Modified Sine Curve $$Jx=(\pi+2) \cdot Amax^2/Vx$$

(3) Case of Triangular Curve $$Jx=Amax^2/Vx$$

After the maximum jerk value Jx is obtained, both maximum operating velocity Va and maximum operating acceleration Aa are obtained. The maximum operating velocity Va and maximum operating acceleration Aa to be calculated anew are given through the following three expressions in accordance with each acceleration/deceleration curve. In each acceleration/deceleration curve, the maximum operating velocity Va and maximum operating acceleration Aa are calculated by the following expressions (13) and (14) respectively.

(1) Case of Sine Curve $$Sx=\pi \cdot Vx^2/2Amax$$

$$S=\pi \cdot Va^2/2Aa$$

$$2 \cdot Amax^2/Vx=2 \cdot Aa^2/Va$$

(2) Case of Modified Sine Curve $$Sx=2\pi \cdot Vx^2/(\pi+2) \cdot Amax)$$

$$S=2\pi \cdot Va^2/(\pi+2) \cdot Aa)$$

$$((\pi+2) \cdot Amax^2)/Vx=((\pi+2) \cdot Aa^2)/Va$$

(3) Case of Triangular Curve $$Sx=2Vx^2/Amax$$

$$S=2Va^2/Aa$$

$$Amax^2/Vx=Aa^2/Va$$

$$Va=Vx \cdot (S/Sx)^{2/3} \quad (13)$$

$$Aa=Amax \cdot (S/Sx)^{1/3} \quad (14)$$

In this manner, the maximum velocity Va and maximum acceleration Aa are obtained in an acceleration/deceleration process having a designated jerk algorithm in accordance with the commanded quantity S of motor movement corresponding to the small movement. An acceleration/deceleration curve is generated on the basis of the maximum velocity Va and maximum acceleration Aa, so that acceleration/deceleration control is performed on the basis of the acceleration/deceleration curve.

Thereafter, the same operation as in the case of general positioning is carried out. That is, the operation termination time Tend is calculated (S7), the quantity of movement in each sampling time (Tsample) is calculated on the basis of the maximum velocity Va and maximum acceleration Aa, the target portion reference is obtained on the basis of the quantity of movement (S8 to S12), and the position reference value is supplied to the servomotor controller 4 (S13 and S14) while interlocking is made. The servomotor controller 4 converts the position reference value into a torque reference value and controls the servomotor 5 to move in accordance with the torque reference value. The processing from step S9 to step S14 is repeated up to the operation termination time Tend. When the operation termination time Tend (S10) is reached, the operation is terminated. Although this embodiment has shown the case where the termination of the operation is judged by time, it is a matter of course that the termination of the operation can be judged by the quantity of movement per se. The method of interlocking with the servomotor controller 4 is not limited to the aforementioned method.

Figure 10:
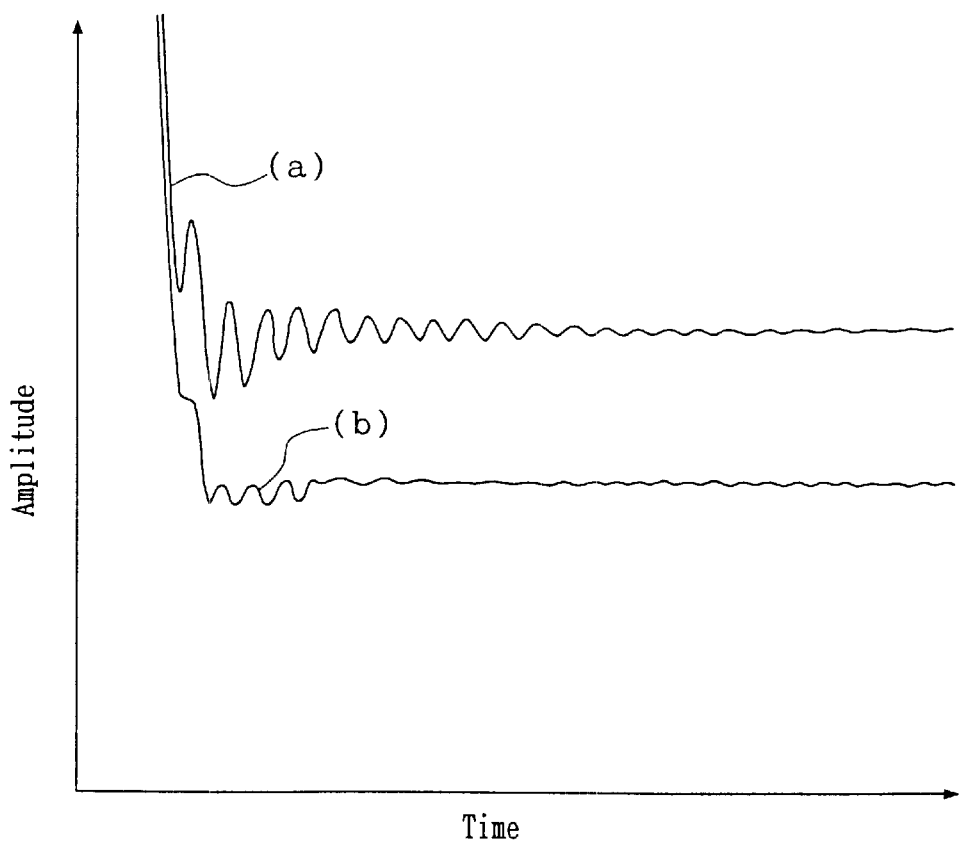
FIG. 10 is a graph for explaining the difference in a residual vibration characteristic of a mechanical system with a small quantity of motor movement, between a designated acceleration control and a designated jerk control.

FIG. 10 is a graph for explaining difference in residual vibration characteristic of a mechanical system at the time of the small movement between the case (a) where the mechanical system is under the designated acceleration control and the case (b) where the mechanical system is under the designated jerk control. Incidentally, the time and amplitude are shown along the horizontal axis and the vertical axis respectively, while this graph is not quantitatively rigorous. It is apparent from FIG. 10 that residual vibration in the designated jerk control is smaller than that in the designated acceleration control.

As described above in detail, in this embodiment, the maximum jerk value in the designated jerk control is made coincident with a predetermined value so that the maximum jerk value is limited and prevented from taking a large value. Hence, vibration given to a manipulator can be suppressed. Particularly at the time of driving (start of acceleration) or stopping (end of deceleration) of the manipulator when the jerk value is maximized, an arm of the manipulator can be driven or stopped without much vibration. Hence, residual vibration is reduced, so that speedy positioning can be performed and the working speed can be improved.

Moreover, the designated jerk control, the maximum jerk value at the switching point in the designated acceleration control is used as the maximum jerk value of the designated jerk control, so that the velocity, the acceleration and the moving time change continuously in accordance with the quantity of movement of the manipulator. Hence, a natural operation is obtained as a whole.

Moreover, the designated jerk control and designated acceleration control can be switched over to each other. Hence, a system can be constructed in consideration of both reduction of moving time and suppression of vibration.

Moreover, the switching point can be changed at user's option. Hence, the switching point can be set so as to be optimized in accordance with the accuracy, the allowable range of vibration, etc. required of the constructed system.

Moreover, the switching point can be designated by a nondimensional parameter (rate). Hence, the switching point can be set without considering the quantity of motor movement.

Although this embodiment has been described in connection with the three cases of the acceleration function, the present invention is not limited thereto and any function can be selected if the function satisfies continuity.

Although this embodiment has been described upon the case where one servomotor 5 is provided, it is a matter of course that a plurality of servomotors may be provided.

What is claimed is:

1. In acceleration/deceleration control of changing acceleration continuously to thereby make acceleration or deceleration, a method of determining velocity and acceleration of a motor for generating an acceleration/deceleration/curve of the motor in the case where a commanded quantity of motor movement is smaller than a minimum quantity of motor movement which is required to allow the movement of said motor to reach a predetermined maximum velocity and a predetermined maximum acceleration, wherein said method comprises a step of determining a maximum velocity and a maximum acceleration for performing a designated jerk control in accordance with said commanded quantity of motor movement so as to make a maximum absolute value of jerk value which is differential value of acceleration, not larger than a predetermined value or equal to the predetermined value.

2. A method of determining velocity and acceleration of a motor according to claim 1, wherein said designated jerk control is provided for performing positioning of a subject of control while suppressing vibration of said subject.

3. A method for generating an acceleration/deceleration curve of a motor, comprising a step of generating an acceleration/deceleration curve on the basis of the maximum velocity and the maximum acceleration obtained by the method of determining velocity and acceleration of a motor defined in claim 1.

4. In acceleration/deceleration control of changing acceleration continuously to thereby make acceleration or deceleration, a method of determining velocity and acceleration of a motor for generating an acceleration/deceleration curve of the motor in the case where a commanded quantity of motor movement is smaller than a minimum quantity of motor movement which is required to allow the movement of said motor to reach a predetermined maximum velocity and a predetermined maximum acceleration, wherein said method comprises a step of determining a maximum velocity and a maximum acceleration by selecting and performing one of two processes in accordance with the commanded quantity of motor movement, said two processes consisting of processes of: newly determining a maximum velocity for performing a designated acceleration control in accordance with said command quantity of motor movement while adapting said predetermined maximum acceleration as a maximum acceleration for said control; and determining a maximum velocity and a maximum acceleration for performing a designated jerk control in accordance with said command quantity of motor movement so as to make a maximum absolute value of jerk value, which is differential value of acceleration, not larger than a predetermined value or equal to the predetermined value.

5. A method of determining velocity and acceleration of a motor according to claim 4, wherein said predetermined value in said designated jerk control is the maximum absolute value of jerk value in said designated acceleration control at a switching point where the process is switched.

6. A method of determining velocity and acceleration of a motor according to claim 5, wherein the maximum absolute value of jerk value at said switching point is specified on the basis of a maximum velocity which is required to obtain the commanded quantity of motor movement by said predetermined maximum acceleration and on the basis of said predetermined maximum acceleration.

7. A method of determining velocity and acceleration of a motor according to any one of claims 5 and 6, wherein setting of said switching point can be changed at option by a user.

8. A method of determining velocity and acceleration of a motor according to claim 5, wherein said switching point is designated by a nondimensional parameter.

9. A method of determining velocity and acceleration of a motor according to claim 8, wherein said parameter is a ratio with respect to said minimum quantity of motor movement.

10. A method for performing acceleration/deceleration control of a motor to make said motor accelerated/decelerated by changing acceleration of said motor continuously, said method comprising a step of performing acceleration/deceleration control on the basis of a designated jerk control so as to make a maximum of an absolute value of jerk value, which is differential value of acceleration, not larger than a predetermined value or constantly equal to said predetermined value in the case where a commanded quantity of motor movement is smaller than a minimum quantity of motor movement which is required to allow the movement of said motor to reach a predetermined maximum velocity and a predetermined maximum acceleration.

11. A method for performing acceleration/deceleration control according to claim 10, wherein said designated jerk control is provided for performing positioning of a subject control while suppressing vibration of said subject.

12. A method for performing acceleration/deceleration control of a motor to make said motor accelerated/decelerated by changing acceleration of said motor continuously, said method comprising a step of selecting and performing one of two control processes in accordance with a commanded quantity of motor movement in the case where the commanded quantity of motor movement is smaller than a minimum quantity of motor movement which is required to allow the movement of said motor to reach a predetermined maximum velocity and said predetermined maximum acceleration, said two control processes consisting of a designated acceleration control and a designated jerk control, said designated acceleration control controlling the motor so as to make a maximum acceleration in an accelerating/decelerating operation equal to the predetermined maximum acceleration, said designated jerk control controlling the motor so as to make a maximum absolute value of jerk value, which is differential value of acceleration not larger than or constantly equal to a predetermined value.

13. A method for performing acceleration/deceleration control according to claim 12, wherein said predetermined value in said designated jerk control is the maximum absolute value of jerk value in said designated acceleration control at a switching point where the process is switched.

14. A method for performing acceleration/deceleration control according to claim 13, wherein the maximum absolute value of jerk value at said switching point is specified on the basis of a maximum velocity which is required to obtain the commanded quantity of motor movement by said predetermined maximum acceleration and on the basis of said predetermined maximum acceleration.

15. A method for performing acceleration/deceleration control according to any one of claims 13 and 14, wherein setting of said switching point can be changed at option by a user.

16. A method for performing acceleration/deceleration control according to claim 13, wherein said switching point is designated by a nondimensional parameter.

17. A method for performing acceleration/deceleration control according to claim 16, wherein said parameter is a ratio with respect to said minimum quantity of motor movement.

18. An acceleration/deceleration control apparatus for performing acceleration/deceleration control of a motor to make said motor accelerated/decelerated by changing acceleration of said motor continuously, said apparatus comprising:
a velocity and acceleration determining means for determining a maximum velocity and a maximum acceleration for performing a designated jerk control so as to make a maximum absolute value of jerk value, which is differential value of acceleration, not larger than or constantly equal to a predetermined value, in the case where a commanded quantity of motor movement is smaller than a minimum quantity of motor movement which is required to allow the movement of said motor to reach a predetermined maximum velocity and a predetermined maximum acceleration; and
a reference value generating means for generating and outputting a position reference value on the basis of said maximum velocity and maximum acceleration obtained by said velocity and acceleration determining means.

19. A acceleration/deceleration control apparatus according to claim 18, wherein said designated jerk control is provided for performing positioning of a subject of control while suppressing vibration of said subject.

20. A motor control apparatus comprising means for receiving a position reference value supplied from the acceleration/deceleration control apparatus defined in claim 18 so as to control at least one motor in accordance with said position reference value.

21. An acceleration/deceleration control apparatus for performing acceleration/deceleration control of a motor to make said motor accelerated/decelerated by changing acceleration of said motor continuously, said apparatus comprising:
a velocity and acceleration determining means for determining a maximum velocity and a maximum acceleration by selecting and performing one of two processes in accordance with a commanded quantity of motor movement in the case where the commanded quantity of motor movement is smaller than a minimum quantity of motor movement which is required to allow the movement of said motor to reach a predetermined maximum velocity and a predetermined maximum acceleration, said two processes consisting of a process for newly determining a maximum velocity for performing a designated acceleration control on the basis of the commanded quantity of motor movement so as to make a maximum acceleration in an accelerating/decelerating operation equal to the predetermined maximum acceleration, and another process for newly determining a maximum velocity and a maximum acceleration for performing a designated jerk control on the basis of the commanded quantity of motor movement so as to make a maximum absolute value of jerk value, which is differential value of acceleration, not larger than or constantly equal to a predetermined value; and
a reference value generating means for generating and outputting a position reference value on the basis of said maximum velocity and maximum acceleration obtained by said velocity and acceleration determining means.

22. An acceleration/deceleration control apparatus according to claim 21, wherein said predetermined value in said designated jerk control is the maximum absolute value of jerk value in said designated acceleration control at a switching point where the process is switched.

23. An acceleration/deceleration control apparatus according to claim 22, wherein the maximum absolute value of jerk value at said switching point is specified on the basis of a maximum velocity which is required to obtain the commanded quantity of motor movement by said predetermined maximum acceleration and on the basis of said predetermined maximum acceleration.

24. An acceleration/deceleration control apparatus according to any one of claims 22 and 23, further comprising a setting means for setting and changing said switching point.

25. An acceleration/deceleration control apparatus according to claim 22, wherein said switching point is designated by a nondimensional parameter.

26. An acceleration/deceleration control apparatus according to claim 25, wherein said parameter is a ratio with respect to said minimum quantity of motor movement.

27. A motion control method comprising:
defining an acceleration curve at least partially characterized by an acceleration magnitude parameter, said acceleration magnitude parameter being a maximum operating peak value of said acceleration curve;
defining a velocity curve at least partially characterized by a velocity magnitude parameter, said velocity magnitude parameter being a maximum operating peak value of said velocity curve;
determining a minimum critical distance by setting said acceleration magnitude parameter equal to a predetermined maximum acceleration value, setting said velocity magnitude parameter equal to a predetermined maximum velocity value, and defining said minimum critical distance as twice the displacement distance required to reach the velocity of said velocity magnitude parameter along said velocity curve while being accelerated according to said acceleration curve;
receiving displacement distance instructions including sufficient data for determining a target displacement distance;
comparing said target displacement distance to said minimum critical distance;
initiating a motion modification procedure when said target displacement distance is smaller than said minimum critical distance, said motion modification procedure including the execution of a jerk reduction sequence when said target displacement distance is less than a predefined triggering distance, said jerk reduction sequence including:
a) identifying a maximum operating jerk value as the differential of said acceleration curve evaluated at the upper most limit of said triggering distance;

b) modifying said acceleration curve by setting said acceleration magnitude parameter equal to a second peak acceleration value, said second peak acceleration value being selected such that the differentiation of said modified acceleration curve maintains a magnitude not larger than said maximum operating jerk value over said predefined triggering distance.

28. The method of claim 27 wherein said predefined triggering distance is equal to said minimum critical distance.

29. The method of claim 27 wherein said predefined triggering distance less than said target displacement distance.

30. The method of claim 27 wherein said identifying of said maximum operating jerk value in step (a) includes evaluating the differential of said acceleration curve over a continuous time period dependent on the shape of said acceleration curve, and setting said maximum operating jerk value equal to the largest magnitude of the differential of said acceleration curve over said continuous time period.

31. The method of claim 30 wherein said continuous time period is one of an acceleration stage when said acceleration curve has positive values and a deceleration stage when said acceleration curve has negative values.

32. The method of claim 31 wherein said acceleration curve is a continuous curve having one acceleration stage and one deceleration stage.

33. The method of claim 32 wherein said deceleration stage is the inverse of said acceleration stage.

34. The method of claim 32 wherein said jerk reduction sequence further includes:
   c) modifying said velocity curve by setting said velocity magnitude parameter equal to a second peak velocity value, said second peak velocity value being selected such that the combination of said velocity curve and said modified acceleration curve result in jerk parameters continuously not larger than said maximum operating jerk value over said predefined triggering distance.

35. The method of claim 34 wherein said second peak velocity value is proportional to a calculated transition velocity obtained by following sequence steps (i) to (iv), setting said displacement parameter equal to said transition triggering distance, and evaluating for the velocity variable, wherein the evaluated variable is said calculated transition velocity.

36. The method of claim 35 wherein said second peak velocity value is substantially equal said calculated transition velocity multiplied by a ratio quantity raised to a predefined power other than zero and one, wherein ratio quantity is the ratio of said target displacement distance to said transition triggering distance.

37. The method of claim 36 wherein said predetermined power is two-thirds.

38. The method of claim 34 wherein said second peak velocity value is proportional to the ratio of said target displacement distance to said transition triggering distance.

39. The method of claim 27 wherein said second peak acceleration value is proportional to a predefined factor, said predefined factor including a ratio of said target displacement distance to said predefined triggering distance.

40. The method of claim 39 wherein said predefined factor further includes said ratio raised to a predefined power.

41. The method of claim 40 wherein said predefined power is one-third.

42. The method of claim 41 wherein said second peak acceleration value is substantially equal to said predetermined maximum acceleration value multiplied by said predefined factor.

43. The method of claim 42 wherein said acceleration curve is one of a sinusoidal curve and a triangular curve.

44. The method of claim 42 wherein said acceleration curve has a ramping up stage characterized by a first sinusoidal shape, a flat plateau, and a ramping down stage characterized by a second sinusoidal shape.

45. The method of claim 27 wherein said jerk reduction sequence further includes:
   c) modifying said velocity curve by setting said velocity magnitude parameter equal to a second peak velocity value, said second peak velocity value being selected such that the combination of said velocity curve and said modified acceleration curve result in jerk parameters continuously not larger than said maximum operating jerk value over said predefined triggering distance.

46. The method of claim 45 wherein said second peak velocity value is proportional to the magnitude of said velocity curve at the upper most limit of said predefined triggering distance.

47. The method of claim 46 wherein said second peak velocity value is substantially equal to the magnitude of said velocity curve at the upper most limit of said predefined triggering distance multiplied by a ratio quantity raised to a predefined power other than zero and one, wherein said ratio quantity is the ratio of said target displacement distance to said predefined triggering distance.

48. The method of claim 47 wherein said predetermined power is two-thirds.

49. The method of claim 27 wherein said predefined triggering distance is smaller than said minimum critical distance and said motion modification procedure includes the execution of an acceleration control sequence non-concurrent with said jerk reduction sequence, said acceleration control sequence being executed if said target distance is not smaller than said triggering distance, said acceleration control sequence including:
   a) defining a second peak velocity value as the highest magnitude achievable along said velocity curve while following said acceleration curve for an acceleration distance set to half said target displacement distance;
   b) reassigning said second peak velocity value to said velocity magnitude parameter.

50. The method of claim 49, wherein said second peak velocity value is smaller than said predefined maximum velocity value.

51. The method of claim 49 wherein said acceleration control sequence further includes setting said acceleration magnitude parameter equal to said predetermined maximum acceleration value.

52. The method of claim 27 wherein said predefined triggering distance is smaller than said minimum critical distance and said motion modification procedure includes the execution of an acceleration control sequence non-concurrent with said jerk reduction sequence, said acceleration control sequence being executed during the distance from said minimum critical distance to a transition point defined as the upper most point of said triggering distance, said transition point being the transition from said acceleration control sequence to said jerk control sequence, said acceleration control sequence including:
   integrating said velocity curve to create a displacement function defined as a displacement parameter equal to the integral of said velocity curve;
   evaluating said displacement function over a continuous time period dependent on the shape of said acceleration curve to obtain a displacement measure;

re-interpreting said displacement measure in terms of said displacement parameter, said predetermined maximum acceleration value, said predetermined maximum velocity value, and said continuous time period;

substituting a velocity variable in place of said predetermined maximum velocity value;

solving said re-interpreted displacement measure in terms of said velocity variable;

setting said displacement parameter equal to said target displacement distance and evaluating for said velocity variable;

setting said velocity magnitude parameter equal to said velocity variable.

53. The method of claim 52 wherein said displacement measure is doubled prior to being re-interpreted.

54. The method of claim 52 wherein said continuous time period is one of an acceleration stage when said acceleration curve has positive values and a deceleration stage when said acceleration curve has negative values.

55. The method of claim 27 further including setting said acceleration magnitude parameter equal to said predetermined maximum acceleration value and setting said velocity magnitude parameter equal to said predetermined maximum velocity value in response to the comparison of said target displacement distance to said minimum critical distance indicating that said displacement distance is not smaller than said minimum critical distance.

56. The method of claim 27 wherein said predefined triggering distance is a fraction of said minimum critical distance determined by a user specified option.

57. A motion control method comprising:

defining a continuous acceleration curve having an acceleration stage and a deceleration stage and being at least partially characterized by an acceleration magnitude parameter, said acceleration magnitude parameter being a maximum operating peak value of said acceleration curve;

defining a velocity curve having a shape generally determined by the integral of said acceleration curve and being at least partially characterized by a velocity magnitude parameter, said velocity magnitude parameter being a maximum operating peak value of said velocity curve;

determining a minimum critical distance by setting said acceleration magnitude parameter equal to a predetermined maximum acceleration value, setting said velocity magnitude parameter equal to a predetermined maximum velocity value, and defining said minimum critical distance as twice the displacement distance required to reach the velocity of said velocity magnitude parameter along said velocity while following said acceleration curve;

receiving displacement distance instructions including sufficient data for determining a target displacement distance;

comparing said target displacement distance to said minimum critical distance;

initiating a motion modification procedure in response to said target displacement distance being smaller than said minimum critical distance, said motion modification procedure being effective for comparing said target displacement distance to a transition triggering distance and initiating an acceleration control sequence in response to said displacement distance not being smaller than said transition triggering distance and initiating a jerk reduction sequence in response to said displacement distance being smaller than said transition triggering distance, wherein;

said acceleration control sequence includes:

i) integrating said velocity curve to create a displacement function defined as a displacement parameter equal to the integral of said velocity curve;

ii-1) evaluating said displacement function to obtain a displacement measure of the distance required to complete one acceleration stage and one deceleration stage of said acceleration curve;

ii-2) re-interpreting said displacement measure in terms of at least said displacement parameter, said predetermined maximum acceleration value, and said predetermined maximum velocity value;

iii) substituting a velocity variable in place of said predetermined maximum velocity value;

iv) solving said re-interpreted displacement measure in terms of said velocity variable;

v) setting said displacement parameter equal to said target displacement distance and evaluating for said velocity variable;

vi) setting said velocity magnitude parameter equal to the evaluated velocity variable; and said jerk reduction sequence includes:

a) identifying a maximum operating jerk value as the differential of said acceleration curve evaluated at the upper most limit of said transition triggering distance;

b) modifying said acceleration curve by setting said acceleration magnitude parameter equal to a second peak acceleration value, said second peak acceleration value being selected such that the differential of said modified acceleration curve maintains a magnitude not larger than said maximum operating jerk value over said predefined triggering distance.

58. The method of claim 57 wherein said acceleration control sequence further includes setting said acceleration magnitude parameter equal to said predetermined maximum acceleration value.

59. The method of claim 57 further including setting said acceleration magnitude parameter equal to said predetermined maximum acceleration value and setting said velocity magnitude parameter equal to said predetermined maximum velocity value in response to said target displacement distance not being smaller than said minimum critical distance.

60. The method of claim 57 wherein said identifying of said maximum operating jerk value in step (a) includes evaluating the differential of said acceleration curve over a continuous time period spanning one of said acceleration stage and deceleration stage of said acceleration curve, and setting said maximum operating jerk value equal to the largest magnitude of the differential of said acceleration curve over said continuous time period.

61. The method of claim 57 wherein said deceleration stage is the inverse of said acceleration stage.

62. The method of claim 57 wherein said second peak acceleration value in step (b) is proportional to a predefined factor, said predefined factor including a ratio of said target displacement distance to said transition triggering distance.

63. The method of claim 62 wherein said predefined factor further includes said ratio raised to a predefined power.

64. The method of claim 63 wherein said predefined power is one-third.

65. The method of claim 64 wherein said second peak acceleration value is substantially equal to said predetermined maximum acceleration value multiplied by said predefined factor.

66. The method of claim 65 wherein said acceleration curve is one of a sinusoidal curve and a triangular curve.

67. The method of claim 65 wherein said acceleration curve has a ramping up stage characterized by a first sinusoidal shape, a flat plateau, and a ramping down stage characterized by a second sinusoidal shape.

68. The method of claim 57 wherein said transition triggering distance is a fraction of said minimum critical distance determined by a user specified option.

69. A motion control system for a motion actuating apparatus, said system comprising:

a first processing block for selecting an acceleration curve at least partially characterized by an acceleration magnitude parameter, said acceleration magnitude parameter being a maximum operating peak value of said acceleration curve;

a second processing block for selecting a velocity curve at least partially characterized by a velocity magnitude parameter, said velocity magnitude parameter being a maximum operating peak value of said velocity curve;

a third processing block for determining a minimum critical distance by setting said acceleration magnitude parameter equal to a predetermined maximum acceleration value, setting said velocity magnitude parameter equal to a predetermined maximum velocity value, and determining said minimum critical distance as twice the displacement distance required to reach the velocity of said velocity magnitude parameter along said velocity curve while being accelerated according to said acceleration curve;

a control input for receiving displacement distance instructions including sufficient data for determining a target displacement distance;

a comparator block for comparing said target displacement distance to said minimum critical distance;

a velocity and acceleration determining block for initiating a motion modification procedure when said target displacement distance is smaller than said minimum critical distance, said motion modification procedure including the execution of a jerk reduction sequence when said target displacement distance is less then a predefined triggering distance, said jerk reduction sequence including:

a) identifying a maximum operating jerk value as the differential of said acceleration curve evaluated at the upper most limit of said triggering distance;

b) modifying said acceleration curve by setting said acceleration magnitude parameter equal to a second peak acceleration value, said second peak acceleration value being selected such that the differentiation of said modified acceleration curve maintains a magnitude not larger than said maximum operating jerk value over said predefined triggering distance.

70. The system of claim 69 wherein said predefined triggering distance is equal to said minimum critical distance.

71. The system of claim 69 wherein said predefined triggering distance less than said target displacement distance.

72. The system of claim 69 wherein said identifying of said maximum operating jerk value in step (a) includes evaluating the differential of said acceleration curve over a continuous time period dependent on the shape of said acceleration curve, and setting said maximum operating jerk value equal to the largest magnitude of the differential of said acceleration curve over said continuous time period.

73. The system of claim 72 wherein said continuous time period is one of an acceleration stage when said acceleration curve has positive values and a deceleration stage when said acceleration curve has negative values.

74. The system of claim 73 wherein said acceleration curve is a continuous curve having one acceleration stage and one deceleration stage.

75. The system of claim 74 wherein said deceleration stage is the inverse of said acceleration stage.

76. The system of claim 69 wherein said second peak acceleration value is proportional to a predefined factor, said predefined factor including a ratio of said target displacement distance to said predefined triggering distance.

77. The system of claim 76 wherein said predefined factor further includes said ratio raised to a predefined power.

78. The system of claim 77 wherein said predefined power is one-third.

79. The system of claim 78 wherein said second peak acceleration value is substantially equal to said predetermined maximum acceleration value multiplied by said predefined factor.

80. The system of claim 79 wherein said acceleration curve is one of a sinusodial curve and a triangular curve.

81. The system of claim 79 wherein said acceleration curve has a ramping up stage characterized by a first sinusoidal shape, a flat plateau, and a ramping down stage characterized by a second sinusoidal shape.

82. The system of claim 69 wherein said jerk reduction sequence further includes:

c) modifying said velocity curve by setting said velocity magnitude parameter equal to a second peak velocity value, said second peak velocity value being selected such that the combination of said velocity curve and said modified acceleration curve result in jerk parameters continuously not larger than said maximum operating jerk value over said predefined triggering distance.

83. The system of claim 82 wherein said second peak velocity value is proportional to the magnitude of said velocity curve at the upper most limit of said predefined triggering distance.

84. The system of claim 83 wherein said second peak velocity value is substantially equal to the magnitude of said velocity curve at the upper most limit of said predefined triggering distance multiplied by a ratio quantity raised to a predefined power other than zero and one, wherein said ratio quantity is the ratio of said target displacement distance to said predefined triggering distance.

85. The system of claim 84 wherein said predetermined power is two-thirds.

86. The system of claim 69 wherein said predefined triggering distance is smaller than said minimum critical distance and said motion modification procedure includes the execution of an acceleration control sequence non-concurrent with said jerk reduction sequence, said acceleration control sequence being executed if said target distance is not smaller than said triggering distance, said acceleration control sequence including:

a) defining a second peak velocity value as the highest magnitude achievable along said velocity curve while following said acceleration curve for an acceleration distance set to half said target displacement distance;

b) reassigning said second peak velocity value to said velocity magnitude parameter.

87. The system of claim 86 wherein said second peak velocity value is smaller than said predefined maximum velocity value.

88. The system of claim 86 wherein said acceleration control sequence further includes setting said acceleration magnitude parameter equal to said predetermined maximum acceleration value.

89. The system of claim 69 wherein said predefined triggering distance is smaller than said minimum critical distance and said motion modification procedure includes the execution of an acceleration control sequence non-concurrent with said jerk reduction sequence, said acceleration control sequence being executed during the distance span from said minimum critical distance to a transition point set to the upper most point of said triggering distance, said transition point being the transition from said acceleration control sequence to said jerk control sequence, said acceleration control sequence including:

integrating said velocity curve to create a displacement function defined as a displacement parameter equal to the integral of said velocity curve;

evaluating said displacement function over a continuous time period dependent on the shape of said acceleration curve to obtain a displacement measure;

re-interpreting said displacement measures in terms of said displacement parameter, said predetermined maximum acceleration value, said predetermined maximum velocity value, and said continuous time period;

substituting a velocity variable in place of said predetermined maximum velocity value;

solving said re-interpreted displacement measure in terms of said velocity variable;

setting said displacement parameter equal to said target displacement distance and evaluating for said velocity variable;

setting said velocity magnitude parameter equal to said velocity variable.

90. The system of claim 89 wherein said displacement measure is doubled prior to being re-interpreted.

91. The system of claim 89 wherein said continuous time period is one of an acceleration stage when said acceleration curve has positive values and a deceleration stage when said acceleration curve has negative values.

92. The system of claim 69 further including setting said acceleration magnitude parameter equal to said predetermined maximum acceleration value and setting said velocity magnitude parameter equal to said predetermined maximum velocity value in response to the comparison of said target displacement distance to said minimum critical distance indicating that said displacement distance is not smaller than said minimum critical distance.

93. The system of claim 69 wherein said predefined triggering distance is a fraction of said minimum critical distance determined by a user specified option.

94. A motion control system for a motion actuating apparatus, said system comprising:

a first processing block selecting a continuous acceleration curve having an acceleration stage and a deceleration stage and being at least partially characterized by an acceleration magnitude parameter, said acceleration magnitude parameter being a maximum operating peak value of said acceleration curve;

a second processing block defining a velocity curve having a shape generally determined by the integral of said acceleration curve and being at least partially characterized by a velocity magnitude parameter, said velocity magnitude parameter being a maximum operating peak value of said velocity curve;

a third processing block for determining a minimum critical distance by setting said acceleration magnitude parameter equal to a predetermined maximum acceleration value, setting said velocity magnitude parameter equal to a predetermined maximum velocity value, and defining said minimum critical distance as twice the displacement distance required to reach the velocity of said velocity magnitude parameter along said velocity while following said acceleration curve;

a control input for receiving displacement distance instructions including sufficient data for determining a target displacement distance;

a comparator block for comparing said target displacement distance to said minimum critical distance;

a velocity and acceleration determining block for initiating a motion modification procedure in response to said target displacement distance being smaller than said minimum critical distance, said motion modification procedure being effective for comparing said target displacement distance to a transition triggering distance and initiating an acceleration control sequence in response to said displacement distance not being smaller than said transition triggering distance and initiating a jerk reduction sequence in response to said displacement distance being smaller than said transition triggering distance, wherein;

said acceleration control sequence includes:

i) integrating said velocity curve to create a displacement function defined as a displacement parameter equal to the integral of said velocity curve;

ii-1) evaluating said displacement function to obtain a displacement measure of the distance required to complete one acceleration stage and one deceleration stage of said acceleration curve;

ii-2) re-interpreting said displacement measure in terms of at least said displacement parameter, said predetermined maximum acceleration value, and said predetermined maximum velocity value;

iii) substituting a velocity variable in place of said predetermined maximum velocity value;

iv) solving said re-interpreted displacement measure in terms of said velocity variable;

v) setting said displacement parameter equal to said target displacement distance and evaluating for said velocity variable;

vi) setting said velocity magnitude parameter equal to the evaluated velocity variable; and said jerk reduction sequence includes:

a) identifying a maximum operating jerk value as the differential of said acceleration curve evaluated at the upper most limit of said transition triggering distance;

b) modifying said acceleration curve by setting said acceleration magnitude parameter equal to a second peak acceleration value, said second peak acceleration value being selected such that the differential of said modified acceleration curve maintains a magnitude not larger than said maximum operating jerk value over said predefined triggering distance.

95. The system of claim 94 wherein said acceleration control sequence further includes setting said acceleration magnitude parameter equal to said predetermined maximum acceleration value.

96. The system of claim 94 wherein said velocity and acceleration determining block is further effective for setting said acceleration magnitude parameter equal to said predetermined maximum acceleration value and setting said velocity magnitude parameter equal to said predetermined maximum velocity value in response to said target displacement distance not being smaller than said minimum critical distance.

97. The system of claim 94 wherein said identifying of said maximum operating jerk value in step (a) includes evaluating the differential of said acceleration curve over a continuous time period spanning one of said acceleration stage and deceleration stage of said acceleration curve, and setting said maximum operating jerk value equal to the largest magnitude of the differential of said acceleration curve over said continuous time period.

98. The system of claim 94 wherein said deceleration stage is the inverse of said acceleration stage.

99. The system of claim 94 wherein said second peak acceleration value in step (b) is proportional to a predefined factor, said predefined factor including a ratio of said target displacement distance to said transition triggering distance.

100. The system of claim 99 wherein said predefined factor further includes said ratio raised to a predefined power.

101. The system of claim 100 wherein said predefined power is one-third.

102. The system of claim 101 wherein said second peak acceleration value is substantially equal to said predetermined maximum acceleration value multiplied by said predefined factor.

103. The system of claim 102 wherein said acceleration curve is one of a sinusoidal curve and a triangular curve.

104. The system of claim 102 wherein said acceleration curve has a ramping up stage characterized by a first sinusoidal shape, a flat plateau, and a ramping down stage characterized by a second sinusoidal shape.

105. The system of claim 94 wherein said jerk reduction sequence further includes:

c) modifying said velocity curve by setting said velocity magnitude parameter equal to a second peak velocity value, said second peak velocity value being selected such that the combination of said velocity curve and said modified acceleration curve result in jerk parameters continuously not larger than said maximum operating jerk value over said predefined triggering distance.

106. The system of claim 105 wherein said second peak velocity value is proportional to a calculated transition velocity obtained by following sequence steps (i) to (iv), setting said displacement parameter equal to said transition triggering distance, and evaluating for the velocity variable, wherein the evaluated variable is said calculated transition velocity.

107. The system of claim 106 wherein said second peak velocity value is substantially equal said calculated transition velocity multiplied by a ratio quantity raised to a predefined power other than zero and one, wherein ratio quantity is the ratio of said target displacement distance to said transition triggering distance.

108. The system of claim 107 wherein said predetermined power is two-thirds.

109. The system of claim 105 wherein said second peak velocity value is proportional to the ratio of said target displacement distance to said transition triggering distance.

110. The system of claim 94 wherein said transition triggering distance is a fraction of said minimum critical distance determined by a user specified option.

* * * * *